United States Patent
Wu et al.

(10) Patent No.: US 10,277,137 B1
(45) Date of Patent: Apr. 30, 2019

(54) POWER CONVERSION CONTROL CIRCUIT

(71) Applicant: Chicony Power Technology Co., Ltd., New Taipei (TW)

(72) Inventors: Shu-Hao Wu, New Taipei (TW); Fa-Ping Wang, New Taipei (TW); Chung-Shu Lee, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 15/967,107

(22) Filed: Apr. 30, 2018

(30) Foreign Application Priority Data

Feb. 12, 2018 (TW) .............................. 107202176 U

(51) Int. Cl.
G05F 1/565 (2006.01)
H02M 3/335 (2006.01)
H02M 1/34 (2007.01)
H02M 1/00 (2006.01)

(52) U.S. Cl.
CPC ... *H02M 3/33569* (2013.01); *H02M 3/33507* (2013.01); *H02M 2001/0006* (2013.01); *H02M 2001/0025* (2013.01); *H02M 2001/0032* (2013.01); *H02M 2001/342* (2013.01)

(58) Field of Classification Search
CPC ......... H02M 3/335; H02M 2001/0025; H02M 2001/342
USPC ............ 363/21.04, 21.08, 21.12, 21.16, 109; 327/109; 323/271–276
See application file for complete search history.

(56) References Cited

U.S. PATENT DOCUMENTS

| | | | | |
|---|---|---|---|---|
| 6,069,803 A * | 5/2000 | Cross | ................ | H02M 3/33569 363/21.14 |
| 8,009,448 B2 * | 8/2011 | Liu | .................... | H02M 3/33569 363/21.01 |
| 8,456,868 B2 * | 6/2013 | He | .................... | H02M 3/33592 323/286 |
| 8,488,348 B2 * | 7/2013 | Hong | ................ | H02M 3/33569 363/21.18 |
| 8,508,921 B2 * | 8/2013 | Su | ........................... | F16B 2/245 224/666 |
| 9,190,898 B2 | 11/2015 | Brinlee et al. | | |

(Continued)

FOREIGN PATENT DOCUMENTS

CN 102307017 A 1/2012
TW I358188 B 2/2012

*Primary Examiner* — Rajnikant B Patel
(74) *Attorney, Agent, or Firm* — Muncy, Geissler, Olds & Lowe, P.C.

(57) ABSTRACT

A power conversion control circuit, which is applied to a flyback converter having a main switch, includes at least one bypass switch, a half-bridge power control unit, and an active-clamp control unit. The half-bridge power control unit is coupled to the main switch. The active-clamp control unit is coupled to the half-bridge power control unit and the main switch. When the flyback converter is operated in light-load condition, the active-clamp control unit turns on the at least one bypass switch, the half-bridge power control unit is coupled to the ground through the at least one bypass switch, the active-clamp control unit is coupled to the ground through the main switch, and the active-clamp control unit provides a low-side control signal to switch the main switch. Accordingly, it is to make the flyback converter have considerable power saving and energy saving in light-load condition.

11 Claims, 3 Drawing Sheets

(56) References Cited

U.S. PATENT DOCUMENTS

| | | | |
|---|---|---|---|
| 9,252,676 B2 | 2/2016 | Yang et al. | |
| 9,276,483 B2 * | 3/2016 | Yang | H02M 3/33523 |
| 9,379,620 B2 | 6/2016 | Zhang et al. | |
| 9,991,800 B2 * | 6/2018 | Hari | H02M 3/33507 |
| 2013/0063185 A1 * | 3/2013 | Ye | H02M 3/33569 |
| | | | 327/108 |
| 2016/0344293 A1 | 11/2016 | Hari et al. | |
| 2017/0288552 A1 | 10/2017 | Hari et al. | |

* cited by examiner

POWER CONVERSION CONTROL CIRCUIT

BACKGROUND OF THE INVENTION

Technical Field

The present disclosure relates to a power conversion control circuit, and more particularly to a power conversion control circuit which is applied to a flyback converter.

Description of Related Art

The statements in this section merely provide background information related to the present disclosure and do not necessarily constitute prior art.

Based on the cost consideration of a device for power-supplying or charging an electronic product or electronic device, such as a power supply for power-supplying a notebook computer or a charger for charging a hand-held device, flyback converters become the preferred choice due to the advantage of being simple in a circuit topology. Furthermore, an active-clamp flyback converter (ACF) with a zero voltage switching (ZVS) function is used instead in order to meet the demand of low-loss due to the stringent energy-saving and efficiency regulations established by global energy supervisory organizations.

A control chip of the ACF determines the load status thereof by a feedback loop. When the ACF is operated in heavy-load condition, the control chip of the ACF controls switching operations of half-bridge switches to achieve high efficiency of energy transmission. For the half-bridge switches having a high-side switch and a low-side switch which are separately turned on or turned off, the control chip of the ACF turns off the high-side switch of the half-bridge switches and a drive circuit thereof, and switches the low-side switch of the half-bridge switches in an intermittent switching manner when the ACF is operated in light-load condition, thereby controlling the ACF operated in a discontinuous conduction mode (DCM) so as to meet the demand of low-loss.

For the integrated half-bridge switches having the high-side switch and the low-side switch which are simultaneously turned on or turned off, however, the low-side switch is also turned off once the high-side switch and the drive circuit thereof are turned off. Accordingly, the ACF fails to meet the demand of low-loss when being operated in the DCM under light-load condition.

SUMMARY OF THE INVENTION

An object of the present disclosure is to provide a power conversion control circuit to solve the problems of failing to meet the demand of low-loss when being operated under light-load condition for the ACF having the integrated half-bridge switches.

In order to achieve the above-mentioned objective, the power conversion control circuit is applied to a flyback converter having a main switch. The power conversion control circuit includes at least one bypass switch, a half-bridge power control unit, and an active-clamp control unit. The at least one bypass switch is coupled on a first path or a second path, and the main switch is coupled on the second path. The half-bridge power control unit is coupled to the main switch. The active-clamp control unit is coupled to the half-bridge power control unit and the main switch. When the flyback converter is operated in light-load condition, the active-clamp control unit turns on the at least one bypass switch, the half-bridge power control unit is coupled to a ground through the first path and the at least one bypass switch, the active-clamp control unit is coupled to the ground through the second path and the main switch, and the active-clamp control unit provides a low-side control signal to switch the main switch.

In one embodiment, the half-bridge power control unit is further coupled to a power voltage through a third path. When the flyback converter is operated in light-load condition, the half-bridge power control unit is decoupled from the third path to disconnect the power voltage supplying power to the half-bridge power control unit.

In one embodiment, the half-bridge power control unit includes a first switch pin, a low-side drive pin, and an enable pin. The first switch pin is coupled to the main switch. The low-side drive pin is coupled to the main switch. The enable pin is coupled to the first path. The active-clamp control unit includes a second switch pin, a low-side signal control pin, and an enable signal control pin. The second switch pin is coupled to the main switch. The low-side signal control pin is coupled to the main switch and the low-side drive pin, and provides the low-side control signal. The enable signal control pin is coupled to the at least one bypass switch, and provides an enable control signal to control the at least one bypass switch.

In one embodiment, when the number of the at least one bypass switch is one and which is a first bypass switch, the first bypass switch includes a control end, a first end, and a second end. The control end is coupled to the enable signal control pin, and receives the enable control signal. The first end is coupled to the enable pin. The second end is coupled to the ground. The main switch includes a control end, a first end, and a second end. The control end is coupled to the low-side signal control pin, and receives the low-side control signal. The first end is coupled to the first switch pin and the second switch pin. The second end is coupled to the enable pin and the first end of the first bypass switch.

In one embodiment, when the number of the at least one bypass switch is two and which are a first bypass switch and a second bypass switch, the first bypass switch includes a control end, a first end, and a second end, and the second bypass switch includes a control end, a first end, and a second end. The control end of the first bypass switch is coupled to the enable signal control pin, and receives the enable control signal. The second end of the first bypass switch is coupled to the ground. The control end of the second bypass switch is coupled to the enable signal control pin and the control end of the first bypass switch, and receives the enable control signal. The first end of the second bypass switch is coupled to the enable pin. The second end of the second bypass switch is coupled to the ground. The main switch includes a control end, a first end, and a second end. The control end is coupled to the low-side signal control pin, and receives the low-side control signal. The first end is coupled to the first switch pin and the second switch pin. The second end is coupled to the first end of the first bypass switch.

In one embodiment, the half-bridge power control unit further includes a high-side drive pin, a high-side switch, and a low-side switch. The high-side switch is coupled to the high-side drive pin. The low-side switch is coupled to the low-side drive pin, and is coupled in series to the high-side switch to form a common-connected point, wherein the common-connected point is coupled to the main switch. The active-clamp control unit further includes a high-side signal control pin. The high-side signal control pin is coupled to the high-side drive pin, and provides a high-side control signal.

When the flyback converter is operated in heavy-load condition, the active-clamp control unit turns off the main switch and the at least one bypass switch, the half-bridge power control unit is decoupled from the first path and the second path, and the half-bridge power control unit is coupled to the power voltage through the third path. The active-clamp control unit provides the high-side control signal and the low-side control signal to control the high-side switch and the low-side switch of the half-bridge power control unit, respectively.

In one embodiment, when the flyback converter is operated in light-load condition, the active-clamp control unit controls the main switch so that the flyback converter is in a discontinuous conduction mode operation. When the flyback converter is operated in heavy-load condition, the active-clamp control unit controls the high-side switch and the low-side switch so that the flyback converter is in an active-clamp operation.

In one embodiment, the active-clamp control unit further includes a feedback pin. The feedback pin receives a primary-side feedback signal or a secondary-side feedback signal. The active-clamp control unit determines that the flyback converter is operated in light-load condition or heavy-load condition according to the primary-side feedback signal or the secondary-side feedback signal.

In one embodiment, the high-side switch and the low-side switch are simultaneously turned on or turned off.

In one embodiment, the half-bridge power control unit further includes a power enable control unit. The power enable control unit is coupled to the enable pin, the high-side switch, and the low-side switch, and simultaneously turns on or turns off the high-side switch and the low-side switch.

Accordingly, the at least one bypass switch is designed in the electrical connection to make the power voltage supply power to the half-bridge power control unit when the flyback converter is operated in heavy-load condition, or alternatively to disconnect the power voltage supplying power to the half-bridge power control unit when the flyback converter is operated in light-load condition, thereby achieving greater conversion efficiency in heavy-load condition and achieving considerable power saving and energy saving in light-load condition.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWING

The present disclosure can be more fully understood by reading the following detailed description of the embodiment, with reference made to the accompanying drawings as follows.

DETAILED DESCRIPTION

Figure 1:
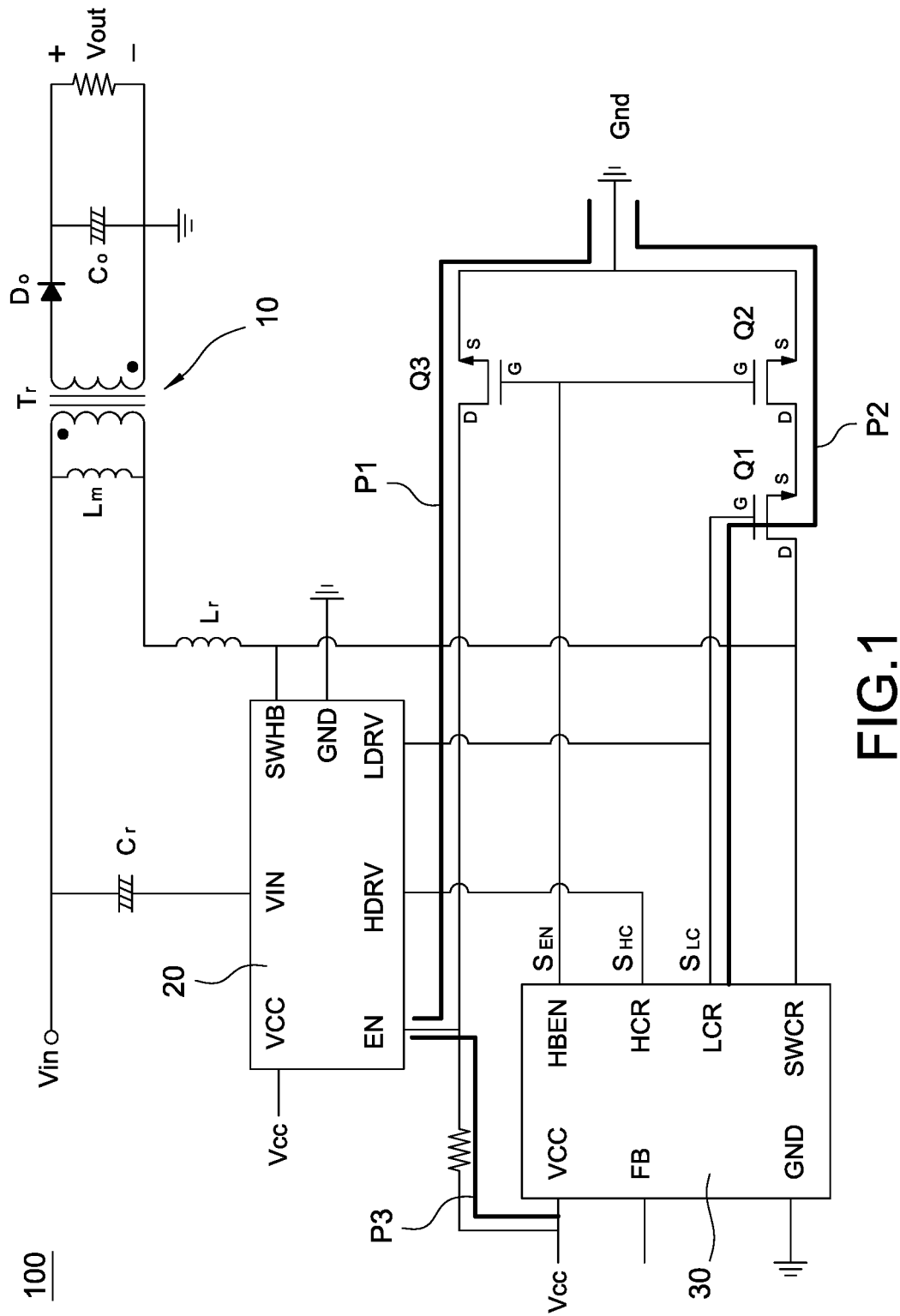
FIG. 1 is a block circuit diagram of a power conversion control circuit according to a first embodiment of the present disclosure.

Reference will now be made to the drawing figures to describe the present disclosure in detail. It will be understood that the drawing figures and exemplified embodiments of present disclosure are not limited to the details thereof.

Please refer to FIG. 1, which shows a block circuit diagram of a power conversion control circuit according to a first embodiment of the present disclosure. The power conversion control circuit 100 is applied to a flyback converter 10 which has a main switch Q1. The main switch Q1 is coupled to a primary side of a transformer of the flyback converter 10, and the main switch Q1 is controlled to transmit an electrical energy from the primary side to a secondary side of the transformer.

In one embodiment, the power conversion control circuit 100 includes two bypass switches having a first bypass switch Q2 and a second bypass switch Q3, a half-bridge power control unit 20, and an active-clamp control unit 30. In one embodiment, the half-bridge power control unit 20 and the active-clamp control unit 30 are, for example but not limited to, integrated circuit ICs with a plurality of pins.

As shown in FIG. 1, the second bypass switch Q3 is coupled on a first path P1, and the first path P1 is formed between the half-bridge power control unit 20 and a ground Gnd. The main switch Q1 and the first bypass switch Q2 are coupled on a second path P2, and the second path P2 is formed between the active-clamp control unit 30 and the ground Gnd.

The half-bridge power control unit 20 includes a first switch pin SWHB, a low-side drive pin LDRV, and an enable pin EN. The first switch pin SWHB is coupled to the main switch Q1, the low-side drive pin LDRV is coupled to the main switch Q1, and the enable pin EN is coupled to the first path P1.

Figure 3:
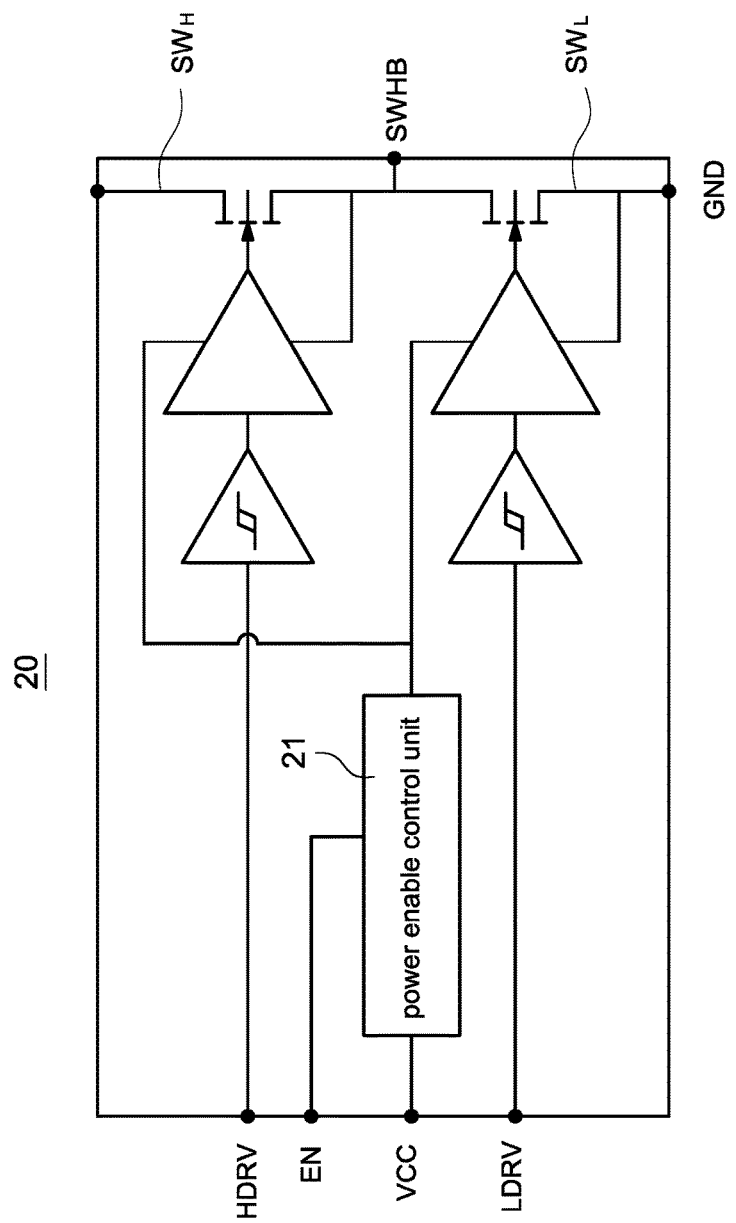
FIG. 3 is a block circuit diagram of a half-bridge power control unit according to the present disclosure.

Please refer to FIG. 3, which shows a block circuit diagram of the half-bridge power control unit according to the present disclosure. The half-bridge power control unit 20 further includes a high-side drive pin HDRV, a high-side switch $SW_H$, a low-side switch $SW_L$, and a power enable control unit 21. The high-side switch $SW_H$ is coupled to the high-side drive pin HDRV. The low-side switch $SW_L$ is coupled to the low-side drive pin LDRV, and coupled in series to the high-side switch $SW_H$ to form a common-connected point. In particular, the common-connected point is corresponding to the first switch pin SWHB to which the main switch Q1 is coupled.

The power enable control unit 21 is coupled to the enable pin EN, the high-side switch $SW_H$, and the low-side switch $SW_L$. The half-bridge power control unit 20 is further coupled to a power voltage Vcc through a third path P3 to receive the power voltage Vcc, and the half-bridge power control unit 20 may be supplied by the power voltage Vcc. In one embodiment, the high-side switch $SW_H$ and the low-side switch $SW_L$ are integrated and simultaneously turned on and turned off. The power enable control unit 21 is controlled through the enable pin EN so that the high-side switch $SW_H$ and the low-side switch $SW_L$ are simultaneously turned on and turned off in accordance with the power voltage Vcc. More specifically, when the power enable control unit 21 is enabled (turned on) through the enable pin EN, the power voltage Vcc supplies power to the half-bridge power control unit 20 through the third path P3, and therefore the high-side switch $SW_H$ and the low-side switch $SW_L$ are simultaneously turned on. On the contrary, when the power enable control unit 21 is disabled (turned off) through the enable pin EN, the half-bridge power control unit 20 is disconnected from the power voltage Vcc through the third path P3, and therefore the high-side switch $SW_H$ and the low-side switch $SW_L$ are simultaneously turned off.

The active-clamp control unit 30 is coupled to the half-bridge power control unit 20, and the active-clamp control unit 30 includes a second switch pin SWCR, a low-side signal control pin LCR, and an enable signal control pin HBEN. The second switch pin SWCR is coupled to the main switch Q1. The low-side signal control pin LCR is coupled to the main switch Q1 and the low-side drive pin LDRV, and provides a low-side control signal $S_{LC}$. The enable signal control pin HBEN is coupled to the first bypass switch Q2 and the second bypass switch Q3, and provides an enable control signal $S_{EN}$ to control the first bypass switch Q2 and the second bypass switch Q3. The active-clamp control unit 30 further includes a high-side signal control pin HCR. The high-side signal control pin HCR is coupled to the high-side drive pin HDRV, and provides a high-side control signal $S_{HC}$.

In one embodiment, the main switch Q1, the first bypass switch Q2, and the second bypass switch Q3 are, for example but not limited to, metal-oxide-semiconductor field-effect transistors (MOSFETs). In addition, other transistors or electronic components which have the on/off switch function can be used as the above switches.

The main switch Q1 has a control end, a first end, and a second end. Take the MOSFET as the main switch Q1, the control end is the gate, the first end is the drain, and the second end is the source of the MOSFET. The first bypass switch Q2 has a control end, a first end, and a second end. Take the MOSFET as the first bypass switch Q2, the control end is the gate, the first end is the drain, and the second end is the source of the MOSFET. Similarly, the second bypass switch Q3 has a control end, a first end, and a second end. Take the MOSFET as the second bypass switch Q3, the control end is the gate, the first end is the drain, and the second end is the source of the MOSFET.

The control end (namely the gate) of the first bypass switch Q2 is coupled to the enable signal control pin HBEN of the active-clamp control unit 30, and receives the enable control signal $S_{EN}$ provided from the active-clamp control unit 30. The second end (namely the source) of the first bypass switch Q2 is coupled to the ground Gnd.

The control end (namely the gate) of the second bypass switch Q3 is coupled to the enable signal control pin HBEN and the control end (namely the gate) of the first bypass switch Q2, and receives the enable control signal $S_{EN}$ provided from the active-clamp control unit 30. The first end (namely the drain) of the second bypass switch Q3 is coupled to the enable pin EN. The second end (namely the source) of the second bypass switch Q3 is coupled to the ground Gnd.

The control end (namely the gate) of the main switch Q1 is coupled to the low-side signal control pin LCR, and receives the low-side control signal $S_{LC}$ provided from the active-clamp control unit 30. The first end (namely the drain) of the main switch Q1 is coupled to the first switch pin SWHB and the second switch pin SWCR. The second end (namely the source) of the main switch Q1 is coupled to the first end (namely the drain) of the first bypass switch Q2.

The active-clamp control unit 30 further includes a feedback pin FB. The feedback pin FB receives a primary-side feedback signal or a secondary-side feedback signal provided from the flyback converter 10. In other words, the feedback pin FB may directly or indirectly receive the primary-side feedback signal or the secondary-side feedback signal provided from the flyback converter 10. In particular, the term "indirectly" means that the feedback pin FB may receive the primary-side feedback signal or the secondary-side feedback signal through a photo coupler or similar to that. Accordingly, the active-clamp control unit 30 may determine that the flyback converter 10 is operated in light-load condition or heavy-load condition according to the primary-side feedback signal or the secondary-side feedback signal.

Figure 2:
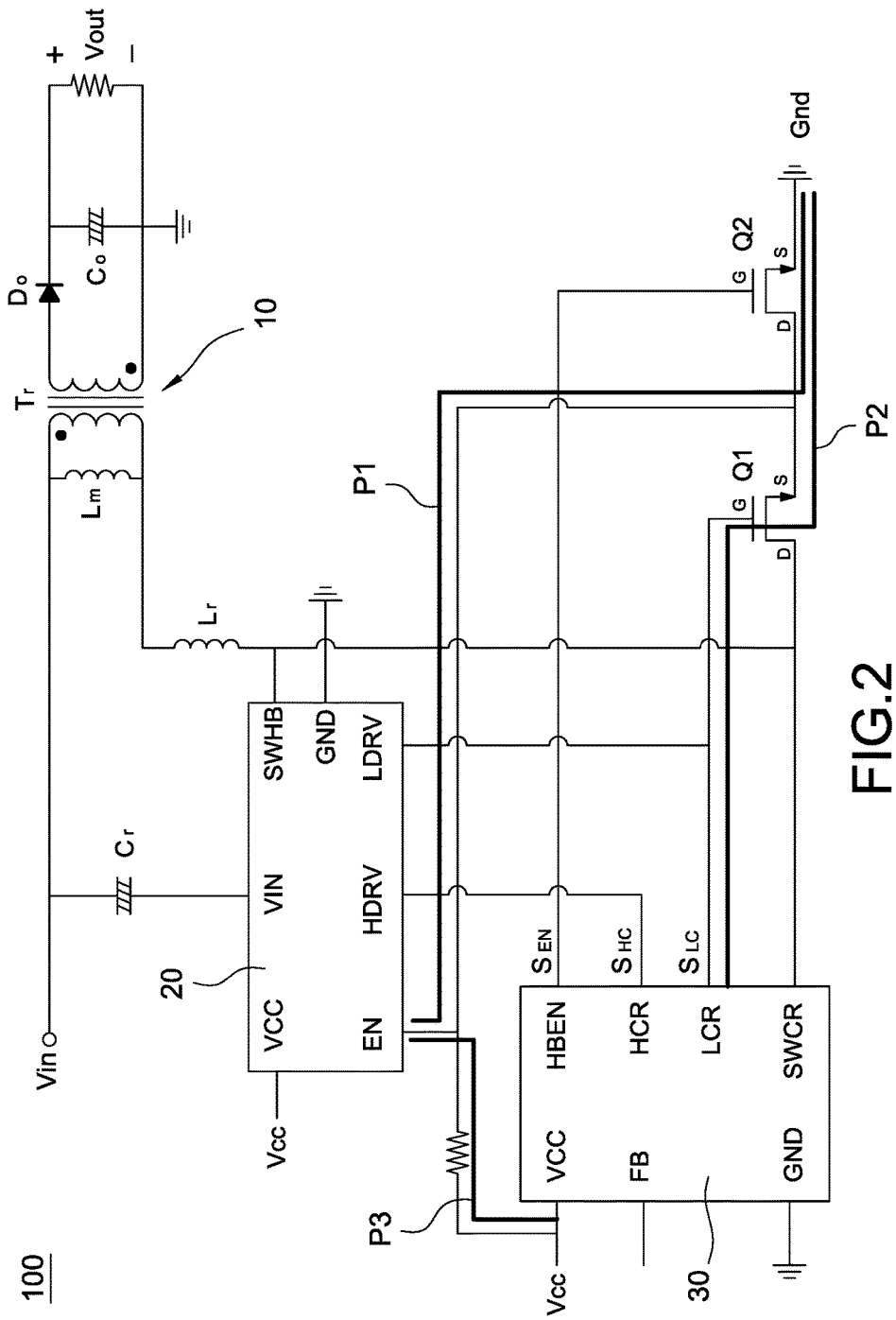
FIG. 2 is a block circuit diagram of the power conversion control circuit according to a second embodiment of the present disclosure.

Please refer to FIG. 2, which shows a block circuit diagram of the power conversion control circuit according to a second embodiment of the present disclosure. The major difference between the first embodiment shown in FIG. 1 and the second embodiment shown in FIG. 2 is that the power conversion control circuit 100 of the latter has only one bypass switch, namely the first bypass switch Q2. The first bypass switch Q2 is coupled on the first path P1, and the first path P1 is formed between the half-bridge power control unit 20 and the ground Gnd. Since the electrical connection relationship of the other circuit elements is substantially the same as that of the first embodiment shown in FIG. 1, the detail description of electrical connections of other circuit elements is omitted here for conciseness, and reference may be made to FIG. 1 and the corresponding descriptions.

When the active-clamp control unit 30 detects that the flyback converter 10 is operated in heavy-load condition through the feedback pin FB, the active-clamp control unit 30 turns off the main switch Q1 and the at least one bypass switch Q2, Q3 so that the half-bridge power control unit 20 is decoupled from the first path P1 and the second path P2, and coupled to the power voltage Vcc through the third path P3.

Take the first embodiment shown in FIG. 1 for example, when the flyback converter 10 is operated in heavy-load condition, the active-clamp control unit 30 turns off the main switch Q1, the first bypass switch Q2, and the second bypass switch Q3 so that the half-bridge power control unit 20 is decoupled from the first path P1 and the second path P2.

Similarly, take the second embodiment shown in FIG. 2 for example, when the flyback converter 10 is operated in heavy-load condition, the active-clamp control unit 30 turns off the main switch Q1 and the first bypass switch Q2 so that the half-bridge power control unit 20 is decoupled from the first path P1 and the second path P2.

At this condition, the half-bridge power control unit 20 is coupled to the power voltage Vcc through the third path P3, and the power voltage Vcc with a higher (voltage) level comparing to that of the ground Gnd makes the power enable control unit 21 be turned on (enabled) through the enable pin EN. Accordingly, the active-clamp control unit 30 provides the high-side control signal $S_{HC}$ to the high-side drive pin HDRV of the half-bridge power control unit 20 and provides the low-side control signal $S_{LC}$ to the low-side drive pin LDRV of the half-bridge power control unit 20 so that the high-side switch $SW_H$ and the low-side switch $SW_L$ of the half-bridge power control unit 20 are simultaneously turned on and turned off, and therefore the flyback converter 10 is in an active-clamp operation to achieve greater conversion efficiency in heavy-load condition.

When the active-clamp control unit 30 detects that the flyback converter 10 is operated in light-load condition through the feedback pin FB, the active-clamp control unit 30 turns on the at least one bypass switch Q2,Q3 so that the half-bridge power control unit 20 is coupled to the ground Gnd through the first path P1 and the at least one bypass switch Q2,Q3, and the active-clamp control unit 30 is coupled to the ground Gnd through the second path P2 and the main switch Q1. Also, the half-bridge power control unit 20 is decoupled from the third path P3 to disconnect the power voltage Vcc supplying power to the half-bridge power control unit 20.

Take the first embodiment shown in FIG. 1 for example, when the flyback converter 10 is operated in light-load condition, the active-clamp control unit 30 turns on the first bypass switch Q2 and the second bypass switch Q3 so that the enable pin EN of the half-bridge power control unit 20 is coupled to the ground Gnd.

Similarly, take the second embodiment shown in FIG. 2 for example, when the flyback converter 10 is operated in light-load condition, the active-clamp control unit 30 turns on the first bypass switch Q2 so that the enable pin EN of the half-bridge power control unit 20 is coupled to the ground Gnd.

At this condition, the half-bridge power control unit 20 is coupled to the ground Gnd through the enable pin EN, and the ground Gnd with a lower (voltage) level comparing to that of the power voltage Vcc makes the power enable control unit 21 be turned off (disabled) through the enable pin EN so that the half-bridge power control unit 20 is decoupled from the third path P3 to disconnect the power voltage Vcc supplying power to the half-bridge power control unit 20, and therefore the high-side switch $SW_H$ and the low-side switch $SW_L$ of the half-bridge power control unit 20 fail to be controlled. Accordingly, the active-clamp control unit 30 provides the low-side control signal $S_{LC}$ to switch the main switch Q1, and therefore the flyback converter 10 is in a discontinuous conduction mode (DCM) operation to achieve considerable power saving and energy saving in light-load condition.

In conclusion, the present disclosure has following features and advantages:

1. The at least one bypass switch Q2, Q3 is designed in the electrical connection to make the power voltage Vcc supply power to the half-bridge power control unit 20 when the flyback converter 10 is operated in heavy-load condition, or alternatively to disconnect the power voltage Vcc supplying power to the half-bridge power control unit 20 when the flyback converter 10 is operated in light-load condition.

2. When the half-bridge power control unit 20 is supplied by the power voltage Vcc, the flyback converter 10 is in an active-clamp operation to achieve greater conversion efficiency in heavy-load condition.

3. When the half-bridge power control unit 20 is disconnected from the power voltage Vcc, the flyback converter 10 is in a discontinuous conduction mode (DCM) operation to achieve considerable power saving and energy saving in light-load condition.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A power conversion control circuit applied to a flyback converter having a main switch, the power conversion control circuit comprising:
   at least one bypass switch coupled on a first path or a second path, and the main switch coupled on the second path;
   a half-bridge power control unit coupled to the main switch, the half-bridge power control unit comprising:
   a first switch pin coupled to the main switch;
   a low-side drive pin coupled to the main switch; and
   an enable pin coupled to the first path;
   an active-clamp control unit coupled to the half-bridge power control unit and the main switch, the active-clamp control unit comprising:
   a second switch pin coupled to the main switch;
   a low-side signal control pin coupled to the main switch and the low-side drive pin, and configured to provide the low-side control signal; and
   an enable signal control pin coupled to the at least one bypass switch, and configured to provide an enable control signal to control the at least one bypass switch;
   wherein when the flyback converter is operated in a light-load condition, the active-clamp control unit is configured to turn on the at least one bypass switch, the half-bridge power control unit is coupled to a ground through the first path and the at least one bypass switch, the active-clamp control unit is coupled to the ground through the second path and the main switch, and the active-clamp control unit is configured to provide a low-side control signal to switch the main switch.

2. The power conversion control circuit in claim 1, wherein the half-bridge power control unit is further coupled to a power voltage through a third path;
   wherein when the flyback converter is operated in the light-load condition, the half-bridge power control unit is decoupled from the third path to disconnect the power voltage supplying power to the half-bridge power control unit.

3. The power conversion control circuit in claim 1, wherein when the number of the at least one bypass switch is one and which is a first bypass switch,
   the first bypass switch comprises:
   a control end coupled to the enable signal control pin, and configured to receive the enable control signal;
   a first end coupled to the enable pin; and
   a second end coupled to the ground; and
   the main switch comprises:
   a control end coupled to the low-side signal control pin, and configured to receive the low-side control signal;
   a first end coupled to the first switch pin and the second switch pin; and
   a second end coupled to the enable pin and the first end of the first bypass switch.

4. The power conversion control circuit in claim 1, wherein when the number of the at least one bypass switch is two and which are a first bypass switch and a second bypass switch,
   the first bypass switch comprises:
   a control end coupled to the enable signal control pin, and configured to receive the enable control signal;
   a first end; and
   a second end coupled to the ground;
   the second bypass switch comprises:
   a control end coupled to the enable signal control pin and the control end of the first bypass switch, and configured to receive the enable control signal;
   a first end coupled to the enable pin; and
   a second end coupled to the ground; and
   the main switch comprises:
   a control end coupled to the low-side signal control pin, and configured to receive the low-side control signal;
   a first end coupled to the first switch pin and the second switch pin; and a second end coupled to the first end of the first bypass switch.

5. The power conversion control circuit in claim 2, wherein when the number of the at least one bypass switch is one and which is a first bypass switch,
the first bypass switch comprises:
a control end coupled to the enable signal control pin, and configured to receive the enable control signal;
a first end coupled to the enable pin; and
a second end coupled to the ground; and
the main switch comprises:
a control end coupled to the low-side signal control pin, and configured to receive the low-side control signal;
a first end coupled to the first switch pin and the second switch pin; and
a second end coupled to the enable pin and the first end of the first bypass switch.

6. The power conversion control circuit in claim 2, wherein when the number of the at least one bypass switch is two and which are a first bypass switch and a second bypass switch,
the first bypass switch comprises:
a control end coupled to the enable signal control pin, and configured to receive the enable control signal;
a first end; and
a second end coupled to the ground;
the second bypass switch comprises:
a control end coupled to the enable signal control pin and the control end of the first bypass switch, and configured to receive the enable control signal;
a first end coupled to the enable pin; and
a second end coupled to the ground; and
the main switch comprises:
a control end coupled to the low-side signal control pin, and configured to receive the low-side control signal;
a first end coupled to the first switch pin and the second switch pin; and
a second end coupled to the first end of the first bypass switch.

7. The power conversion control circuit in claim 2, wherein
the half-bridge power control unit further comprises:
a high-side drive pin;
a high-side switch coupled to the high-side drive pin; and
a low-side switch coupled to the low-side drive pin, and coupled in series to the high-side switch to form a common-connected point, wherein the common-connected point is coupled to the main switch; and
the active-clamp control unit further comprises:
a high-side signal control pin coupled to the high-side drive pin, and configured to provide a high-side control signal;
wherein when the flyback converter is operated in a heavy-load condition, the active-clamp control unit is configured to turn off the main switch and the at least one bypass switch, the half-bridge power control unit is decoupled from the first path and the second path, and the half-bridge power control unit is coupled to the power voltage through the third path; the active-clamp control unit is configured to provide the high-side control signal and the low-side control signal to control the high-side switch and the low-side switch of the half-bridge power control unit, respectively.

8. The power conversion control circuit in claim 7, wherein when the flyback converter is operated in the light-load condition, the active-clamp control unit is configured to switch the main switch so that the flyback converter is in a discontinuous conduction mode operation; when the flyback converter is operated in the heavy-load condition, the active-clamp control unit is configured to control the high-side switch and the low-side switch so that the flyback converter is in an active-clamp operation.

9. The power conversion control circuit in claim 1, wherein the active-clamp control unit further comprises:
a feedback pin configured to receive a primary-side feedback signal or a secondary-side feedback signal;
wherein the active-clamp control unit is configured to determine that the flyback converter is operated in the light-load condition or the heavy-load condition according to the primary-side feedback signal or the secondary-side feedback signal.

10. The power conversion control circuit in claim 7, wherein the high-side switch and the low-side switch are simultaneously turned on or turned off.

11. The power conversion control circuit in claim 10, wherein the half-bridge power control unit further comprises:
a power enable control unit coupled to the enable pin, the high-side switch, and the low-side switch, and configured to simultaneously turn on or turn off the high-side switch and the low-side switch.

* * * * *